Patented Apr. 17, 1951

2,549,713

UNITED STATES PATENT OFFICE 2,549,713

METHOD OF PREPARING CELLULOSE FOR SUBSEQUENT TREATMENT WITH SODIUM HYDROXIDE

Joseph Seiberlich, Durham, N. H., assignor, by mesne assignments, to Research Corporation, New York, N. Y., a corporation of New York No Drawing. Application April 6, 1948, Serial No. 19,438

9 Claims. (Cl. 260—212)

The present invention relates to processes involving the treatment of cellulose with other chemical compounds either to modify the chemical or physical characteristics of the cellulose or to convert the cellulose to compounds of cellulose. More particularly, the invention relates to a method of pretreating cellulose to increase its absorptivity and reactivity and thus effect important economies and advantages in such processes as mercerizing cotton, dyeing, the manufacture of alpha pulp, the manufacture of rayon, the preparation of cellulose ethers and esters, etc.

When a solution of sodium hydroxide comes in contact with cellulose considerable swelling of the cellulose occurs and is desired in many commercial processes. It is accompanied by some decomposition of the cellulose, the extent of which varies with the time of contact with and the concentration of the sodium hydroxide solution.

The present invention is based upon the discovery that the extent of swelling of cellulose by the action of sodium hydroxide is increased and the time required to obtain maximum swelling is reduced if the cellulose has been pretreated with an organic liquid of small molecular size, such as a halogenated hydrocarbon having not more than three carbon atoms. I have discovered further that such pretreatment improves the absorptivity and reactivity of cellulose so that it is more suitable for use in the manufacture of cellulose esters, such as cellulose nitrate, acetate, etc., and in dyeing as well as in processes wherein the cellulose is subjected to the action of sodium hydroxide, such as in mercerizing cotton and in the production of cellulose ethers.

In the practice of the invention the cellulose may be immersed in a liquid halogenated hydrocarbon at normal room temperature but an elevated temperature may be employed. The period of immersion, for maximum benefits, will vary depending upon the bulk and density of the body of cellulose being pretreated. Usually, it is sufficient to saturate the cellulose thoroughly with the pretreating liquid. In each instance, however, the required period of time can be established by immersing test samples for different periods of time and then subjecting each sample to the action of a standard solution of sodium hydroxide until each ceases to swell. The sample having the largest percentage swelling is determined and the time of immersion of this sample in the pretreating liquid is the period of immersion time required for maximum benefits derived by pretreatment. In practice a shorter period of time of immersion in the pretreating liquid may be employed provided it is of sufficient duration to obtain substantial benefits. The minimum period of immersion may be established by comparing the percentage swelling of the above mentioned samples with that of samples which have been immersed in water instead of the pretreating liquid and then subjected to the action of a solution of sodium hydroxide of the same concentration until swelling has ceased.

After the cellulose has been subjected to the action of the pretreating liquid for the desired period of time, it is preferable to remove the pretreating liquid as by pressing or evaporation for economical reasons. The cellulose then may be processed to produce the desired final product as is customary in mercerizing, dyeing, the preparation of cellulose ethers, esters, etc. In most instances in the subsequent processing of the pretreated cellulose, the concentration of the chemical agent or reagent of the time for processing required or both is reduced. In cases involving subsequent treatment with sodium hydroxide, secondary decomposition of the cellulose may be reduced by decreasing the concentration of the solution of sodium hydroxide or the time of treatment. Mercerized yard goods with a more resilient core are obtainable by the practice of the invention.

Illustrative examples of liquid halogenated hydrocarbons which may be employed in the practice of the invention are carbon tetrachloride, ethylene dichloride, trichloroethylene, tetrachloroethane, perchloroethylene, pentachloroethane, acetylene dibromide, propylene bromide, vinyl iodide, ethylene bromide, ethyl bromide, propyl chloride, propyl iodide, dichloromethane, etc.

The invention is illustrated by the following examples. In these examples each test was made with a set of twenty discs of cellulosic material 32 mm. in diameter having a hole about 3 mm. in diameter. Sharp shears were used in cutting the discs in order not to compress the cut edges. The discs of each set were dried to constant weight by heating overnight in an oven at 75° C. and were mounted upon a non-ferrous spindle fixed in a heavy base of lead. Each set was immersed in the pretreating liquid and then was dried to constant weight.

The effect of an 18 per cent solution of sodium hydroxide was then determined as follows. A small weight was placed upon each set to prevent floating in the caustic. Each set was weighed and then was placed in a 500 cc. cylinder and 300 cc. of the caustic solution was poured in as quickly as possible. The time required to obtain maximum swelling was determined with a stop watch. Then the excess caustic solution was drained from the discs and each assembly was weighed to determine the quantity of solution absorbed.

*Example 1*

In this example the cellulosic material was pretreated for 5 minutes and then was immersed in the sodium hydroxide solution for 30 minutes.

| Pretreating liquid | Percentage weight NaOH absorbed |
|---|---|
| Water | 253.5 |
| Pentachlorethane | 408 |
| Tetrachloroethane | 361 |
| Perchloroethane | 365 |
| Trichloroethylene | 478.5 |
| Dichloroethylene | 371 |
| Carbon tetrachloride | 358 |

*Example 2*

In this example cotton linters (97.5%) was immersed in the pretreating liquid for 5 minutes and was then immersed in the sodium hydroxide solution.

| Pretreating liquid | Time in seconds required for maximum swelling |
|---|---|
| Water | 40 |
| Carbon tetrachloride | 15 |

Some of the compounds falling within the scope of the invention, such as carbon tetrafluoride, are gaseous at normal room temperature. When these compounds are employed in the practice of the invention, the pretreatment must be conducted in a closed container under such conditions of temperature and pressure that the pretreating compound is liquid but may be removed and recovered in gaseous form. For economical reasons, the compounds which are liquid at normal room temperature and atmospheric pressure are preferred.

I claim:

1. The method of increasing the absorptivity of cellulose for and its reactivity with sodium hydroxide which comprises immersing cellulose in a liquid consisting essentially of a halogenated hydrocarbon having not more than three carbon atoms, and thereafter immersing the cellulose in a solution of sodium hydroxide.

2. The method of increasing the absorptivity of cellulose for and its reactivity with sodium hydroxide which comprises immersing cellulose in a liquid consisting essentially of a chlorinated hydrocarbon having not more than three carbon atoms, and thereafter immersing the cellulose in a solution of sodium hydroxide.

3. The method according to claim 1 in which the halogenated hydrocarbon is carbon tetrachloride.

4. The method according to claim 1 in which the halogenated hydrocarbon is ethylene dichloride.

5. The method according to claim 1 in which the halogenated hydrocarbon is trichloroethane.

6. The method according to claim 1 in which the halogenated hydrocarbon is pentachloroethane.

7. The method according to claim 1 in which the halogenated hydrocarbon is perchloroethane.

8. The method of increasing the absorptivity of cellulose for and its reactivity with sodium hydroxide which comprises immersing cellulose in a liquid consisting essentially of a halogenated hydrocarbon having not more than three carbon atom, treating said cellulose to substantially remove said liquid therefrom, and thereafter immersing the cellulose in a solution of sodium hydroxide.

9. The method of increasing the absorptivity of cellulose for and its reactivity with sodium hydroxide which comprises immersing cellulose in a liquid consisting essentially of a chlorinated hydrocarbon having not more than three carbon atoms, removing the cellulose from said liquid and heating the cellulose to substantially evaporate the absorbed liquid therefrom, and thereafter immersing the cellulose in a solution of sodium hydroxide.

JOSEPH SEIBERLICH.

REFERENCES CITED

The following references are of record in the file of this patent:

UNITED STATES PATENTS

| Number | Name | Date |
|---|---|---|
| 847,658 | Dritter | Mar. 19, 1907 |
| 847,985 | Dritter | Mar. 19, 1907 |
| 1,880,051 | Schur et al. | Sept. 27, 1932 |
| 2,084,833 | Berl | June 22, 1937 |
| 2,172,242 | Fordyce et al. | Sept. 5, 1939 |
| 2,174,894 | Richter et al. | Oct. 3, 1939 |
| 2,232,926 | Peterson et al. | Feb. 25, 1941 |